(12) United States Patent
Yokota

(10) Patent No.: US 6,299,322 B1
(45) Date of Patent: Oct. 9, 2001

(54) ILLUMINATING DEVICE FOR A PORTABLE RADIO APPARATUS

(75) Inventor: Hidetsugu Yokota, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/563,480

(22) Filed: May 2, 2000

(30) Foreign Application Priority Data

May 6, 1999 (JP) .................................................. 11-126445

(51) Int. Cl.$^7$ .................................................. F21V 23/04
(52) U.S. Cl. .................................. 362/85; 362/86; 362/276
(58) Field of Search .................................. 362/23, 24, 29, 362/85, 86, 295, 276, 802; 200/310, 313, 314, 317

(56) References Cited

U.S. PATENT DOCUMENTS

| 4,222,039 | * | 9/1980 | Cronin .................................. 200/314 |
| 4,812,831 | * | 3/1989 | Laier .................................... 200/314 |
| 5,205,637 | * | 4/1993 | Caspari .................................. 362/23 |
| 5,655,826 | * | 8/1997 | Kouno et al. ........................... 362/24 |
| 6,145,998 | * | 11/2000 | Lynch et al. ............................ 362/85 |

FOREIGN PATENT DOCUMENTS

| 56-64523 | 6/1981 | (JP) . |
| 61-26353 | 2/1986 | (JP) . |
| 3-296123 | 12/1991 | (JP) . |
| 8-125730 | 5/1996 | (JP) . |
| 9-62198 | 3/1997 | (JP) . |
| 9-247727 | 9/1997 | (JP) . |

* cited by examiner

Primary Examiner—Alan Cariaso
(74) Attorney, Agent, or Firm—Scully, Scott, Murphy & Presser (57) ABSTRACT

An illuminating device for a portable radio apparatus of the present invention is capable of selectively turning on or turning off illumination in accordance with the environment around the apparatus, particularly lightness. This, coupled with the fact that the illuminating device can suitably adjust even an illumination, saves power to a considerable degree. Moreover, when the illuminating device includes light sensing means, it causes control means to automatically turn on or turn off illumination and adjusts an illumination in accordance with lightness around the apparatus. Therefore, even when the user of the apparatus forgets to switch the ON/OFF state of illumination, power consumption of the apparatus can be reduced as far as possible.

21 Claims, 6 Drawing Sheets

ILLUMINATING DEVICE FOR A PORTABLE RADIO APPARATUS

BACKGROUND OF THE INVENTION

The present invention relates to a portable radio apparatus and more particularly to an illuminating device for a portable radio apparatus capable not only of selectively turning on or turning off illuminating means assigned to keys and a display in accordance with an environment around the apparatus, but also of adjusting an illumination to thereby save power as far as possible.

Today, portable radio apparatuses including handy phones and PHS (Personal Handyphone System) are extensively used and can be operated without regard to the environment, i.e., inside or outside of homes and offices. Generally, a portable radio apparatus includes LEDs (Light Emitting Elements) or similar illuminating device for facilitating user's operations even in darkness. The illuminating device, however, aggravates power consumption of the apparatus. This is a serious problem because many of portable radio apparatuses are powered by batteries.

In light of the above, Japanese Patent Laid-Open Publication No. 3-296123, for example, discloses a handy data terminal including switching means for selectively turning on or turning off power supply to a light source that illuminates display means at the back of the display means. Japanese Patent Laid-Open Publication No. 9-62198 teaches a display device included in a handy terminal for selectively turning on or turning off each of a plurality of display regions constituting an image display. These terminals each are constructed to turn off illumination in a daytime, outdoor environment in order to save power.

However, in parallel with the miniaturization of portable radio apparatuses and therefore that of batteries for powering them, there is an increasing demand for an illuminating device consuming even less power than the conventional illuminating devices.

Technologies relating to the present invention are also disclosed in, e.g., Japanese Patent Laid-Open Publication Nos. 56-64523 and 61-26353 and Japanese Patent Laid-Open Publication Nos. 8-125730 and 9-247727.

SUMMARY OF THE INVENTION

It is therefore an object of the present invention to provide an illuminating device for a portable radio apparatus capable of reducing power consumption as far as possible.

In accordance with the present invention, a device included in a portable radio apparatus for illuminating keys and a display to thereby enhance the easy operation of the keys and the visibility of the display includes illuminating elements for illuminating the keys and the display. A switching circuit selectively turns on or turns off the illuminating elements. An adjusting circuit adjusts an illumination of the illuminating elements to desired one. An inputting section allows the user of the apparatus to selectively input the turn-on or the turn-off of the illuminating elements and a desired illumination. A controller feeds command signals to the switching circuit and adjusting circuit in accordance with information input on the inputting section.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Preferred embodiments of the illuminating device in accordance with the present invention will be described hereinafter. While the following description concentrates on a handy phone belonging to a family of portable ratio apparatuses, the present invention is similarly applicable to any other portable radio apparatus, e.g., a PHS or similar handy terminal.

The handy phone to which the illustrative embodiments are applied will be briefly described with reference to FIG. 1. As shown, the handy phone, generally 1, includes a key section 2 and a display 3. The key section 2 includes a plurality of keys 2a and 2b for inputting, e.g., a phone number. The display 3 displays a phone number or similar information input on the keys 2a and 2b, allowing the user to confirm it by eye. LEDs, not shown, are positioned behind the keys 2a and 2b and display 3 in order to illuminate them, as needed.

It is to be noted that the key 2b is a function key to be operated by the user for selecting a desired mode available with the handy phone 1. The function key 2b is also operated to turn on or turn off illumination as well as to adjust an illumination, as will be described hereinafter.

Figure 1:
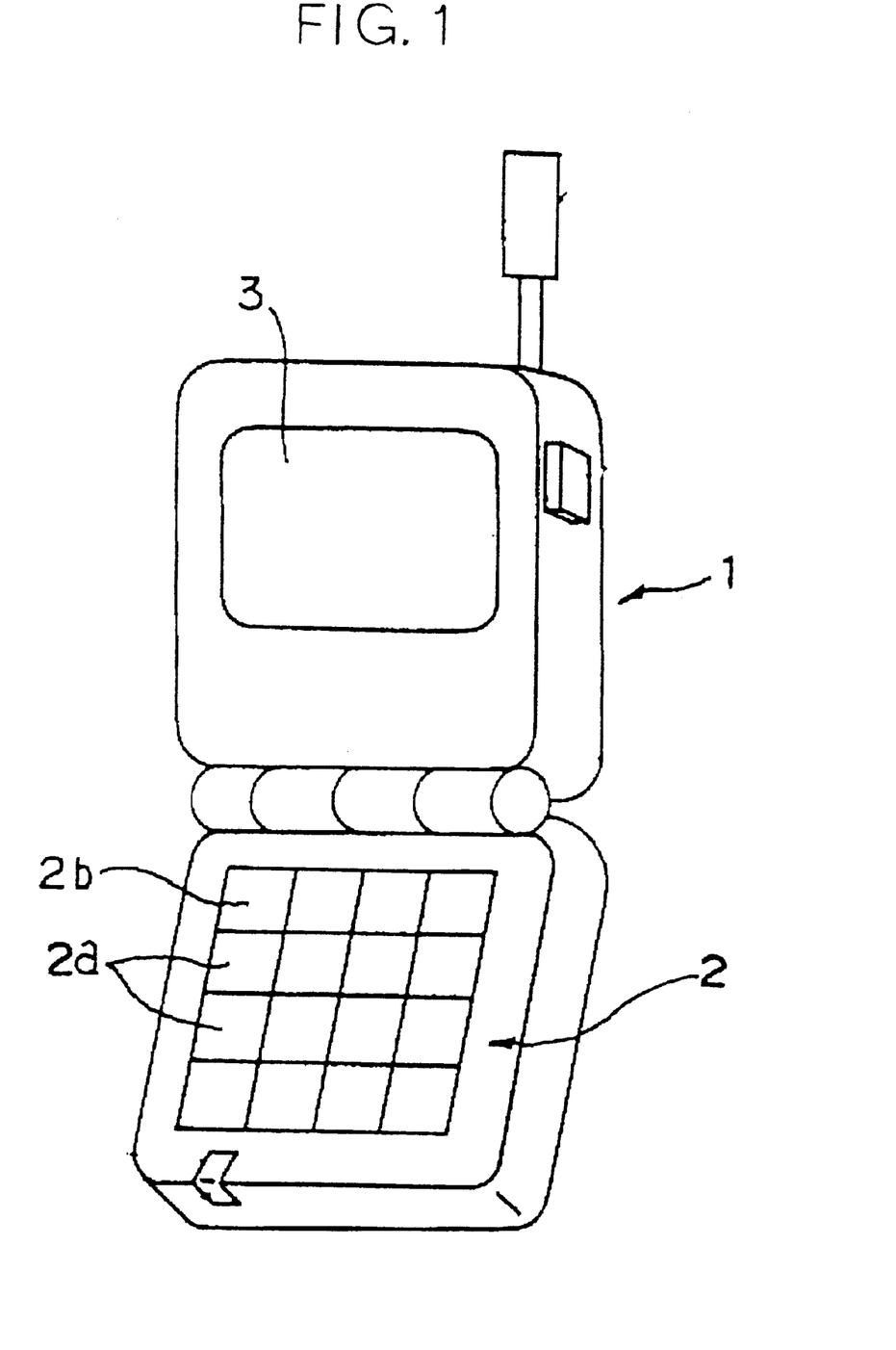
FIG. 1 is a view showing a portable radio apparatus to which the present invention is applied and implemented as a handy phone.
Figure 2:
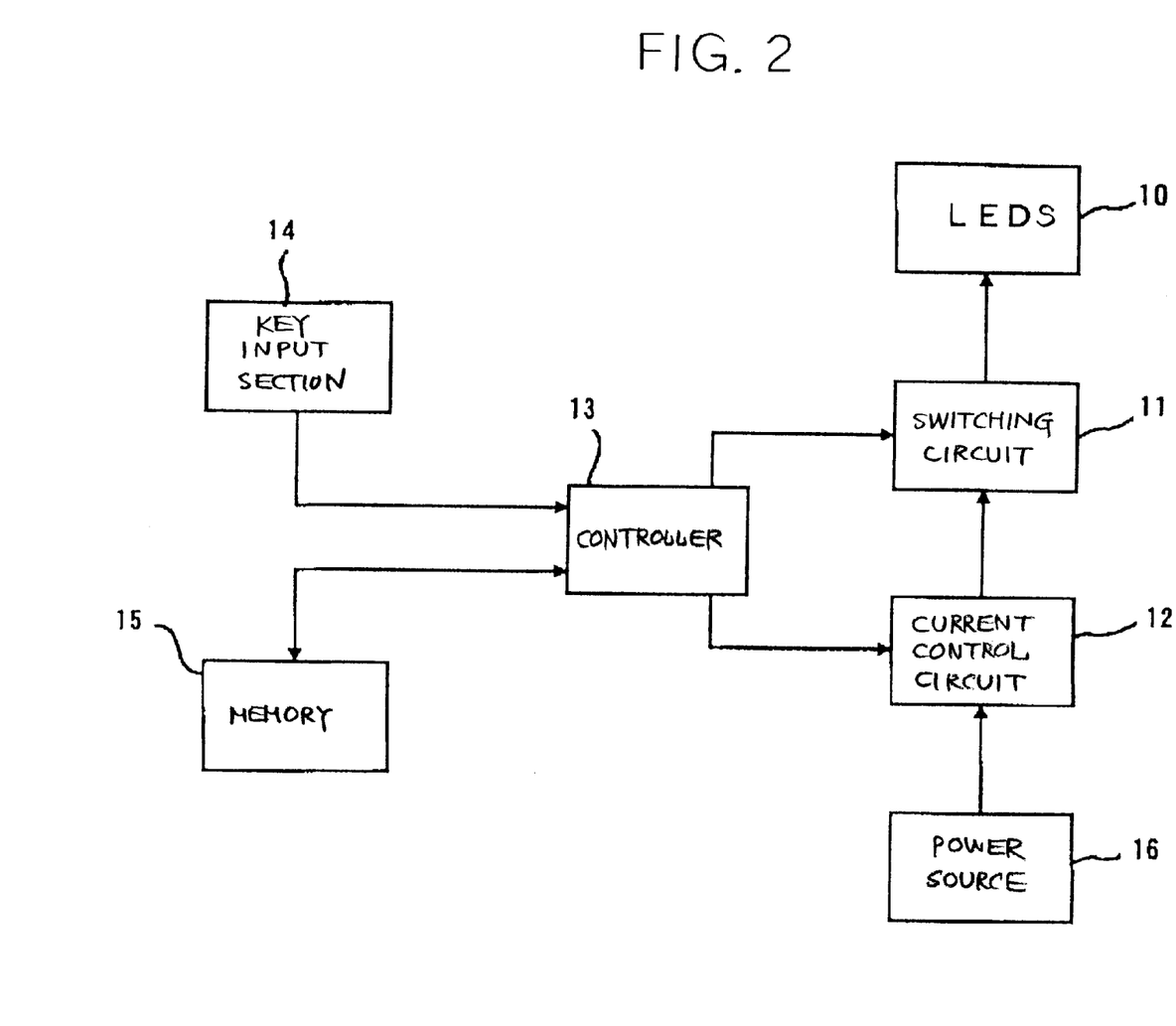
FIG. 2 is a block diagram schematically showing a first embodiment of the illuminating device in accordance with the present invention.

Reference will be made to FIG. 2 for describing a first embodiment of the illuminating device in accordance with the present invention. As shown, the illuminating device includes LEDs 10 for illuminating the key section 2 and display 3, FIG. 1. The LEDs 10 are connected to a switching circuit or switching means 11 that selectively turns on or turns off the LEDs 10. The switching circuit 11 is connected to a current control circuit 12 that controls a current to flow to the LEDs 10. When the LEDs 10 are switched on, a current flows from the current control circuit 12 to the LEDs 10.

A battery or similar power source 16 is connected to the current control circuit 12. The switching circuit 11 and current control circuit 12 are connected to a controller 13. The controller 13 feeds command signals to the switching circuit 11 and current control circuit 12 for turning on or turning off the LEDs 10 or controlling the current to flow to the LEDs 10, as needed.

A key input section 14 and a memory 15 are also connected to the controller 13. The key input section 14 allows the user to turn on or turn off the LEDs 10 or select a desired illumination on, e.g., the mode key 2b, FIG. 1. Specifically, when the user operates the mode key 2b for, e.g., turning on or turning off the LEDs 10, the key input section 14 sends a corresponding signal to the controller 13. The memory 15 stores turn-on or turn-off or an illumination selected by the user.

In operation, assume that the user selects an illumination adjust mode on the mode key 2b for turning on or turning off the LEDs 10 or selecting a desired illumination. In response, an inquiry menu inquiring the user whether the LEDs 10 should be turned on or turned off or a desired illumination. It is preferable to inquire the user whether the LEDs 10 should be turned on or turned off first, and then whether which illumination should be set up. Preferably, five to ten different illuminations should be set stepwise beforehand. The controller 13 determines, based on the signal received from the key input section 14, information input by the user and then writes the result of decision in the memory 15. Information existing in the memory 15 is replaced with the above information, i.e., the memory 15 is updated.

Figure 3:
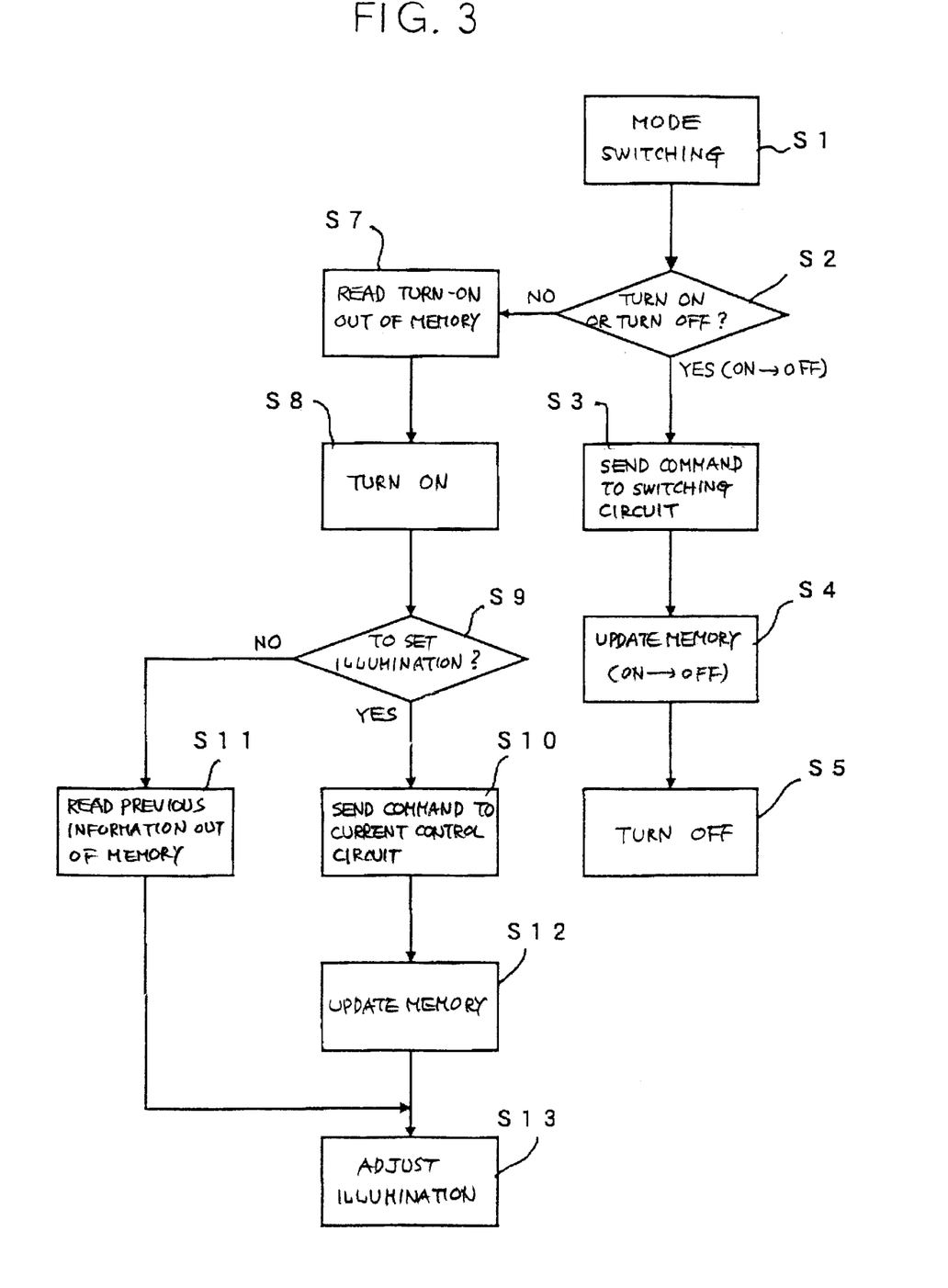
FIG. 3 is a flowchart demonstrating a specific operation of the first embodiment.

A specific operation of the illustrative embodiment will be described hereinafter with reference to FIG. 3. As shown, assume that the user, using the handy phone 1 outside of a building, selects the illumination adjust mode on the mode key 2b in order to turn off the LEDs 10 (step S1). In response, the inquiry menu appears on the display 3. The user, watching the inquiry menu, selects turn-off (Y (positive), step S2). The key input 14 sends a signal representative of the selection of turn-off to the controller 13. In response, the controller 13 determines that the user has selected turn-off, and delivers a turn-off command signal to the switching circuit 11 (step S3). At the same time, the controller 13 delivers a command signal to the memory 15 for causing it to replace ON information existing therein with OFF information (step S4). On receiving the turn-off command signal, the switching circuit 11 turns off the LEDs 10 (step S5).

When the user uses the handy phone 1 in, e.g., a dark room, the user is not expected to select the illumination adjust mode (N (negative), step S2). In this case, when the user turns on a power switch, not shown, provided on the handy phone 1, the controller 13 reads ON information out of the memory 15 (step S7) and delivers a turn-on command signal to the switching circuit 11. In response, the switching circuit 11 turns on the LEDs 10 (step S8). Subsequently, the controller 13 inquires the user whether or not the existing illumination should be changed (step S9). If the answer of the step S9 is N, the controller 13 reads the previous illumination out of the memory 15 (step S1). If the answer of the step S9 is Y, the controller 13 receives a new illumination from the key input section 14 and, in turn, delivers a command signal based on the illumination to the current control circuit 12 (step S10). At the same time, the controller 13 updates the memory 15 with information representative of the new illumination (step S12). As a result, the current control circuit 12 adjusts the LEDs 10 to the desired illumination (step S13).

Figure 4:
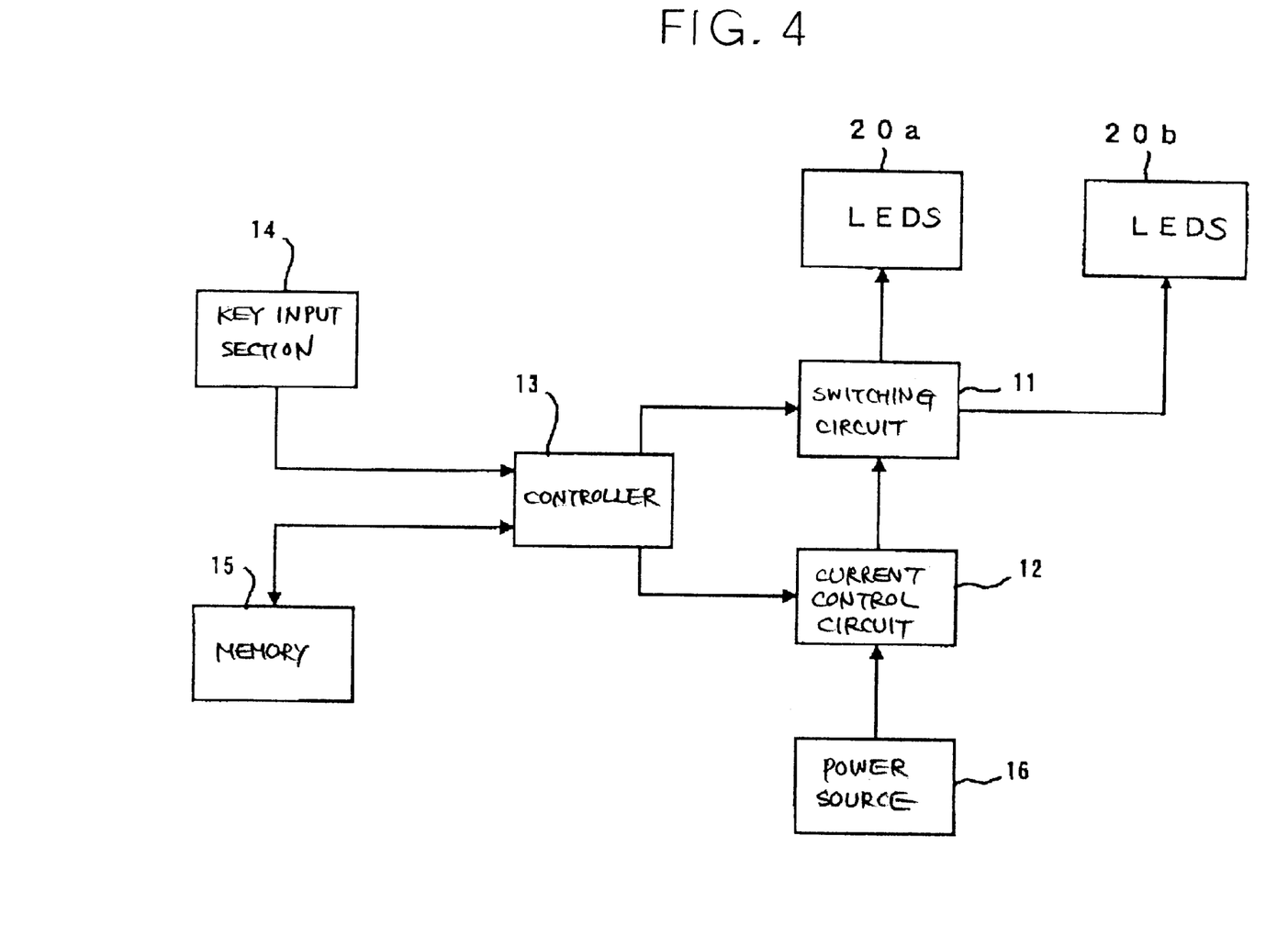
FIGS. 4, 5 and 6 are block diagrams schematically showing a second, a third and a fourth embodiment of the present invention, respectively.

FIG. 4 shows a second embodiment of the illuminating device in accordance with the present invention. In FIG. 4, the structural elements identical with the structural elements shown in FIG. 2 are designated by identical reference numerals and will not be described specifically in order to avoid redundancy. As shown, the second embodiment differs from the first embodiment in that it includes LEDs 20a and 20b for illuminating the key section 2 and display 3, respectively. The LEDs 20a and 20b are connected to the switching circuit 1 which are, in turn, connected to the controller 13 and current control circuit 12.

In the illustrative embodiment, the handy phone 1, FIG. 1, inquires the user whether or not illumination should be turned on or turned off and a desired illumination for each of the LEDs 20a and 20b. Information input by the user in response to the LED-by-LED inquiries are written to the memory 15 LED by LED. Therefore, when the user intends to use the handy phone 1 in a place that is too dark to see the display 3, but not too dark to operate the keys 2a and 2b, the user can turn off the LED 20a assigned to the key section 2 and turn on the LED 20b assigned to the display 3 with a suitable illumination.

Figure 5:
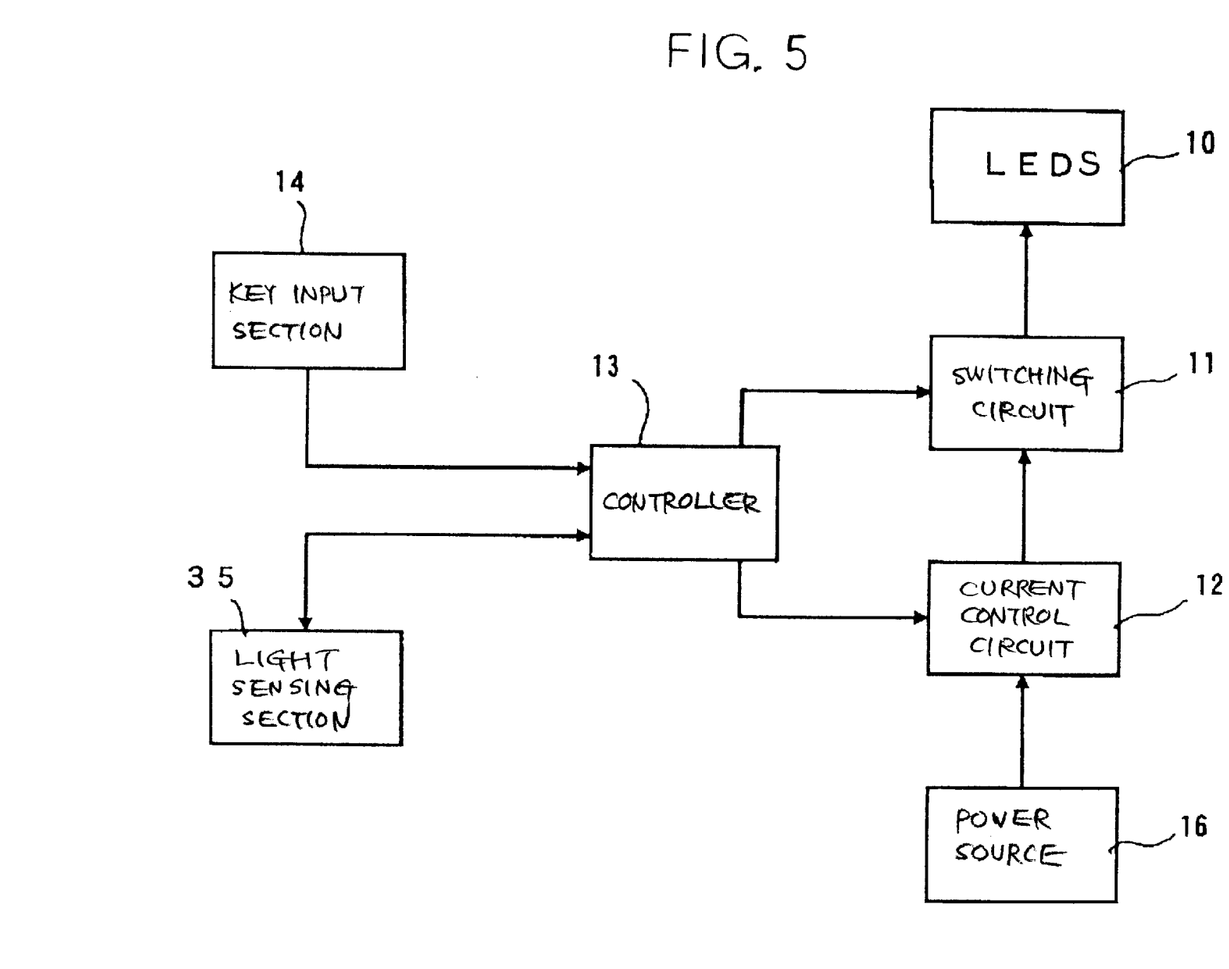

FIG. 5 shows a third embodiment of the illuminating device in accordance with the present invention. As shown, the third embodiment is identical with the first embodiment except for the substitution of a light sensing section 35 for the memory 15. In FIG. 5, structural elements identical with the structural elements shown in FIG. 2 are designated by identical reference numerals and will not be described in order to avoid redundancy. As shown, the light sensing section 35 is connected to the controller 13 and responsive to light around the handy phone 1, FIG. 1. The light sensing section 35 includes a photodiode, phototransistor, photothyristor or similar sensor responsive to the intensity of incident light, an amplifier for amplifying the output of the sensor, and an analog-to-digital converter, although not shown specifically.

The light sensing section 35 sends its output representative of the intensity of light incident thereto to the controller 13. The controller 13 processes the sensor output in order to determine the degree of lightness around the handy phone 1. The controller 13 then delivers an LED ON/OFF command signal to the switching circuit 11 in accordance with the degree of lightness determined. In this manner, the controller 13 automatically turns on or turns off the LEDs 10 in matching relation to the environment in which the handy phone 1 is used.

Figure 6:
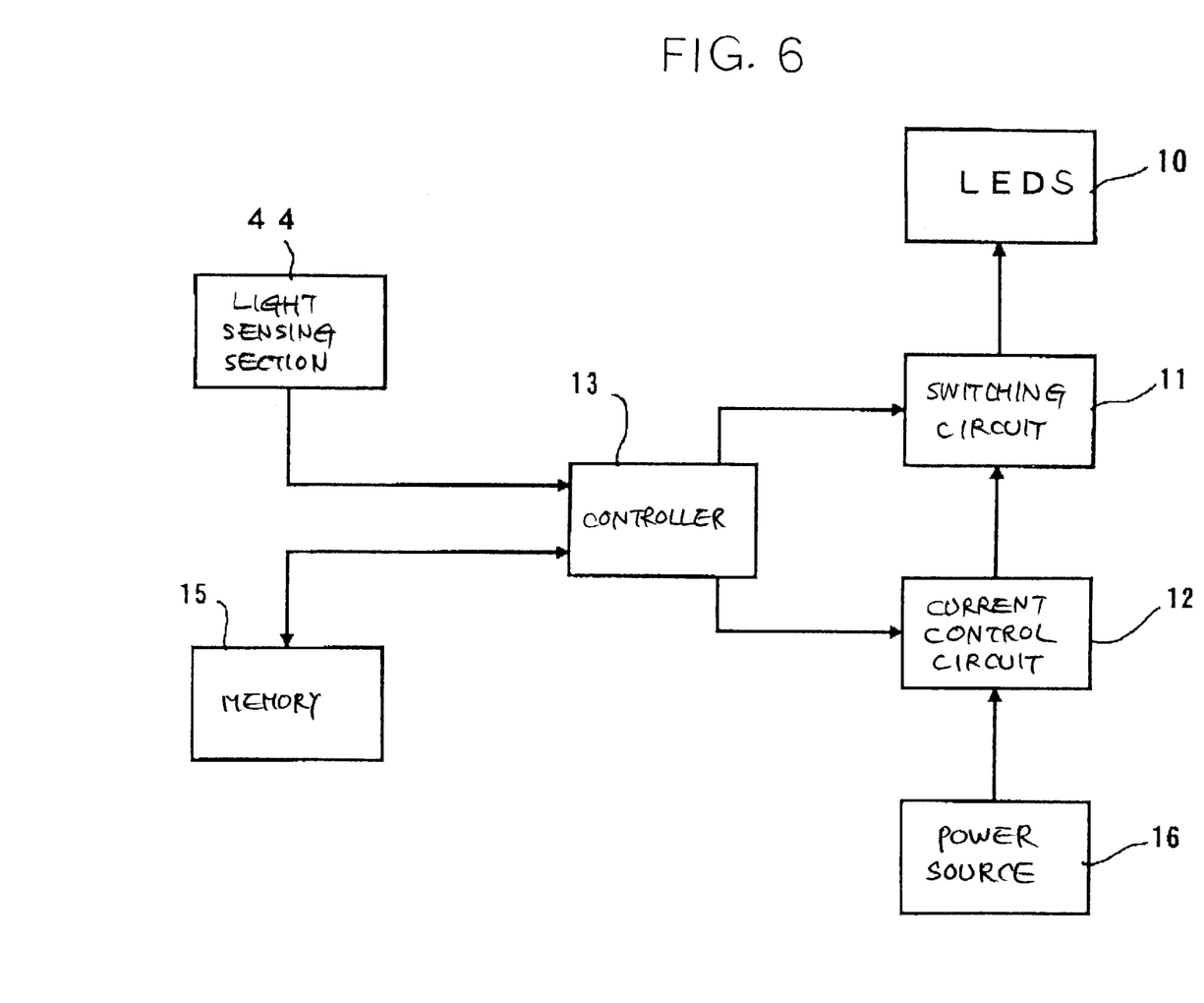

FIG. 6 shows a fourth embodiment of the illuminating device in accordance with the present invention. As shown, the fourth embodiment is identical with the first embodiment in that it includes a light sensing section 44 in place of the key input section 14. In FIG. 6, structural elements identical with the structural elements shown in FIG. 2 are designated by identical reference numerals and will not be described specifically in order to avoid redundancy. As shown, the light sensing section 44 is connected to the controller 13 and identical in configuration with the light sensing section 35, FIG. 5.

In the illustrative embodiment, the memory 15 stores beforehand the correspondence between some different degrees of lightness around the handy phone 1 and the ON/OFF states and illuminations of the LEDs 10 as parameters. For example, the environment around the handy phone 1 may be divided into a plurality of steps as to lightness, e.g., from dead darkness to daytime outdoor lightness, in which case a particular ON/OFF state and a particular illumination will be assigned to each step.

In operation, the light sensing section 44 sends a signal representative of the intensity of light incident thereto to the controller 13. In response, the controller 13 processes the input signal to thereby determine the degree of lightness around the handy phone 1, and then reads a combination of ON/OFF state and illumination matching with the degree of lightness out of the memory 15. In this manner, the illustrative embodiment is capable not only of automatically turning on or turning off the LEDs 10 in accordance with the environment around the handy phone 1, but also automatically adjusting even an illumination.

In summary, it will be seen that the present invention provides an illuminating device capable of selectively turning on or turning off illumination in accordance with the environment around a portable radio apparatus, particularly lightness. This, coupled with the fact that the illuminating device can suitably adjust even an illumination, saves power to an unprecedented degree. Moreover, when the illuminating device includes light sensing means, it causes control means to automatically turn on or turn off illumination and adjusts an illumination in accordance with lightness around the portable radio apparatus. Therefore, even when the user of the apparatus forgets to switch the ON/OFF state of illumination, power consumption of the apparatus can be reduced as far as possible.

Various modifications will become possible for those skilled in the art after receiving the teachings of the present disclosure without departing from the scope thereof. For example, while the second embodiment controls the key section 2 and display 3 separately as to the ON/OFF state and the adjustment of illumination, it may execute such control and adjustment with each of subsections of the key section 2 and display 3. The LEDs 10 may be replaced with any other suitable illuminating means so long as the illumination is adjustable.

What is claimed is:

1. A device included in a portable radio apparatus for illuminating keys and a display to thereby enhance an easy operation of said keys and visibility of said display, said device comprising:

illuminating means for illuminating the keys and the display;

switching means for selectively turning on or turning off said illuminating means;

adjusting means for adjusting an illumination of said illuminating means to a desired illumination;

inputting means for allowing a user of said portable radio apparatus to selectively input a turn-on or a turn-off of said illuminating means and the desired illumination; and control means for feeding command signals to said switching means and said adjusting means in accordance with information input on said inputting means.

2. A device as claimed in claim 1, further comprising a memory for storing the information relating to the turn-on or the turn-off and the illumination input on said inputting means, wherein said control means writes the turn-on or the turn-off or a change of the illumination of said illuminating means in said memory as updating information.

3. A device as claimed in claim 2, wherein said illuminating means comprises:

a display illuminating section for illuminating the display; and a key illuminating section for illuminating the keys;

wherein said switching means and said adjusting means respectively perform the turn-on and the turn-off and an adjustment of the illumination with each of said display illuminating section and said key illuminating section.

4. A device as claimed in claim 3, wherein said memory stores a correspondence between degrees of lightness around the portable radio apparatus and ON/OFF states and illuminations beforehand.

5. A device as claimed in claim 4, wherein said inputting means comprises a sensor responsive to light around the portable radio apparatus, and wherein said control means determines whether said illuminating means should be turned on or turned off and an illumination of said illuminating means in accordance with an output of said sensor.

6. A device as claimed in claim 5, wherein said memory stores beforehand ON/OFF states and illuminations each being assigned to a particular output of said sensor as parameters.

7. A device as claimed in claim 3, wherein said inputting means comprises a sensor responsive to light around the portable radio apparatus, and wherein said control means determines whether said illuminating means should be turned on or turned off and an illumination of said illuminating means in accordance with an output of said sensor.

8. A device as claimed in claim 7, wherein said memory stores beforehand ON/OFF states and illuminations each being assigned to a particular output of said sensor as parameters.

9. A device as claimed in claim 2, wherein said memory stores a correspondence between degrees of lightness around the portable radio apparatus and ON/OFF states and illuminations beforehand.

10. A device as claimed in claim 9, wherein said inputting means comprises a sensor responsive to light around the portable radio apparatus, and wherein said control means determines whether said illuminating means should be turned on or turned off and an illumination of said illuminating means in accordance with an output of said sensor.

11. A device as claimed in claim 10, wherein said memory stores beforehand ON/OFF states and illuminations each being assigned to a particular output of said sensor as parameters.

12. A device as claimed in claim 2, wherein said inputting means comprises a sensor responsive to light around the portable radio apparatus, and wherein said control means determines whether said illuminating means should be turned on or turned off and an illumination of said illuminating means in accordance with an output of said sensor.

13. A device as claimed in claim 12, wherein said memory stores beforehand ON/OFF states and illuminations each being assigned to a particular output of said sensor as parameters.

14. A device as claimed in claim 1, wherein said illuminating means comprises:

a display illuminating section for illuminating the display; and a key illuminating section for illuminating the keys;

wherein said switching means and said adjusting means respectively perform the turn-on and the turn-off and an adjustment of the illumination with each of said display illuminating section and said key illuminating section.

15. A device as claimed in claim 14, wherein said memory stores a correspondence between degrees of lightness around the portable radio apparatus and ON/OFF states and illuminations beforehand.

16. A device as claimed in claim 15, wherein said inputting means comprises a sensor responsive to light around the portable radio apparatus, and wherein said control means determines whether said illuminating means should be turned on or turned off and an illumination of said illuminating means in accordance with an output of said sensor.

17. A device as claimed in claim 16, wherein said memory stores beforehand ON/OFF states and illuminations each being assigned to a particular output of said sensor as parameters.

18. A device as claimed in claim 14, wherein said inputting means comprises a sensor responsive to light around the portable radio apparatus, and wherein said control means determines whether said illuminating means should be turned on or turned off and an illumination of said illuminating means in accordance with an output of said sensor.

19. A device as claimed in claim 18, wherein said memory stores beforehand ON/OFF states and illuminations each being assigned to a particular output of said sensor as parameters.

20. A device as claimed in claim 1, wherein said inputting means comprises a sensor responsive to light around the portable radio apparatus, and wherein said control means determines whether said illuminating means should be turned on or turned off and an illumination of said illuminating means in accordance with an output of said sensor.

21. A device as claimed in claim 20, wherein said memory stores beforehand ON/OFF states and illuminations each being assigned to a particular output of said sensor as parameters.

* * * * *